Patented Jan. 24, 1933

1,895,014

UNITED STATES PATENT OFFICE

JORGEN E. THOMSEN AND JAMES J. O'LAUGHLIN, OF JERSEY CITY, NEW JERSEY, ASSIGNORS TO JOSEPH DIXON CRUCIBLE COMPANY, OF JERSEY CITY, NEW JERSEY, A CORPORATION OF NEW JERSEY

LUBRICATING COMPOSITION AND METHOD OF MAKING THE SAME

No Drawing.   Application filed December 1, 1930.  Serial No. 499,405.

This invention relates to improved lubricating compositions and methods of making the same, and particularly to those which contain graphite or other solid lubricant.

Proposals have heretofore been made to prepare liquid or plastic compositions for lubricating purposes by incorporating graphite in a fluid medium, but for one reason or another, which need not be discussed here, these have not proven entirely satisfactory. It is sufficient to say that the desired characteristics of such compositions are so varied and often conflicting that the production of a suitable composition is one of considerable difficulty. For instance, the material should be capable of being readily applied to and smoothly spread over the surface to be lubricated, with the graphite evenly and thoroughly distributed through, and intimately admixed with, the medium which serves as a vehicle therefor. The graphite should not separate from any portions of the vehicle so as to leave them without adequate amounts of lubricant. Also, on evaporation of liquid the resultant mass should be capable of yielding or flowing under pressure. Moreover, it should not have the tendency, possessed by oily materials, to absorb or collect foreign matter, such as dirt and grit.

We have found that improved compositions embodying these and other advantages may be prepared by incorporating graphite or other solid lubricant in a solution of a gum, said solution preferably containing one or more ingredients, such as triethanolamine or sodium naphthionate or both, adapted to impart to the product a certain elasticity or capability of yielding under pressure on evaporation of the solvent. The gum which we have found to be best suited to these purposes is gum tragacanth, although other soluble gums, such as gum arabic, are advantageous.

Merely by way of example, in preparing the composition, we take gum tragacanth and dissolve it in water containing triethanolamine or sodium naphthionate or both. Commercial graphite or other solid lubricant is then intimately mixed with the solution to obtain a fine dispersion. Without intending to be restricted to any particular proportions of the ingredients, we have found that the following formula yields a highly satisfactory lubricant:

| | Parts by weight |
|---|---|
| Graphite | 85 |
| Gum tragacanth | 10 |
| Triethanolamine | 1.6 |
| Sodium naphthionate | 2 |
| Water | q. s. |

The proper amount of water to use may be readily determined according to the solubility of the gum used and the desired consistency of the product and should be varied accordingly. That is, the composition may be in paste-form or more fluid. The graphite, of course, is the major ingredient and must be present in such quantities as to insure sufficient lubrication. Otherwise the percentage thereof may be varied at will. Though graphite is preferred, other lubricants such as talc or soapstone may be used. In general, the best results are secured by the use of 5 or 10 to 20% of triethanolamine based upon the amount of gum used. It is to be understood that the proportions may be modified according to the particular ingredients used. Moreover, while it is generally desirable to use a water soluble gum to avoid the need of expensive solvents, the invention also comprises the use of gums in other solvents.

Our lubricating compositions are adapted to be applied to all surface requiring lubrication, and when so applied, gradually dry out to deposit firm, smooth films which adhere to the surfaces and insure efficient lubrication over long periods of time.

In so far as the novel products are concerned, we do not wish to be limited to these as produced by any particular methods, but intend to cover them however prepared. Neither is the invention to be limited save by the scope of the appended claims.

Having thus described the invention what we claim as new is:—

1. A lubricating composition comprising a solid lubricant, a solution of a gum, and triethanolamine.

2. A lubricating composition comprising a solid lubricant, a solution of a gum, and sodium naphthionate.

3. A lubricating composition comprising a solid lubricant, a solution of a gum, and triethanolamine and sodium naphthionate.

4. A lubricating composition comprising graphite, a water solution of gum tragacanth, and triethanolamine.

5. A lubricating composition containing water, approximately 85 parts by weight of graphite, 10 parts by weight of gum tragacanth, 1.6 parts by weight of triethanolamine, and 2 parts by weight of sodium naphthionate.

6. A lubricant in paste form containing water, approximately 85 parts by weight of graphite, 10 parts by weight of gum tragacanth, 1.6 parts by weight of triethanolamine, and 2 parts by weight of sodium naphthionate.

JORGEN E. THOMSEN.
JAMES J. O'LAUGHLIN.